(12) United States Patent
Xie et al.

(10) Patent No.: US 12,373,111 B2
(45) Date of Patent: Jul. 29, 2025

(54) MONITORING MEMORY DEVICE HEALTH ACCORDING TO DATA STORAGE METRICS

(71) Applicant: MICRON TECHNOLOGY, INC., Boise, ID (US)

(72) Inventors: Tingjun Xie, Milpitas, CA (US); Seungjune Jeon, Santa Clara, CA (US); Zhenlei Shen, Milpitas, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/460,112

(22) Filed: Aug. 27, 2021

(65) Prior Publication Data

US 2023/0063498 A1   Mar. 2, 2023

(51) Int. Cl.
*G06F 3/06* (2006.01)
(52) U.S. Cl.
CPC .......... *G06F 3/0616* (2013.01); *G06F 3/0653* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 2008/0140918 A1* | 6/2008 | Sutardja | ............... | G06F 12/0246 |
| | | | | 711/E12.001 |
| 2009/0271485 A1* | 10/2009 | Sawyer | ................... | G06F 3/061 |
| | | | | 709/206 |
| 2014/0297926 A1 | 10/2014 | Ono | | |
| 2015/0339070 A1 | 11/2015 | Lee et al. | | |
| 2016/0034206 A1* | 2/2016 | Ryan | ..................... | G06F 3/0605 |
| | | | | 711/103 |
| 2016/0210050 A1* | 7/2016 | Hyun | ..................... | G06F 3/0611 |
| 2017/0131948 A1* | 5/2017 | Hoang | .................. | G06F 3/0679 |
| 2018/0165021 A1* | 6/2018 | Tomic | ..................... | G06F 3/064 |
| 2018/0364911 A1* | 12/2018 | Gupta | .................. | G06F 3/0622 |

(Continued)

OTHER PUBLICATIONS

International Search Report and Written Opinion for International Application No. PCT/US2022/041753, mailed Dec. 20, 2022, 9 Pages.

*Primary Examiner* — Jared I Rutz
*Assistant Examiner* — Alexander J Yoon
(74) *Attorney, Agent, or Firm* — Lowenstein Sandler LLP

(57) ABSTRACT

A plurality of memory device life metrics are determined, where one of the plurality of memory device life metrics comprises a read count metric that specifies a number of read operations performed on the memory device. A plurality of normalized metric values are calculated, where each of the normalized metric values is based on a ratio of a respective memory device life metric to a respective lifetime target value associated with the respective memory device life metric. A normalized metric value that satisfies a selection criterion is identified from the plurality of normalized metric values. The identified normalized metric value corresponds to an amount of used device life of the memory device. An amount of remaining device life of the memory device is determined based on the identified normalized metric value. An indication of the amount of remaining device life is provided to a host system.

20 Claims, 5 Drawing Sheets

(56) References Cited

U.S. PATENT DOCUMENTS

| | | | |
|---|---|---|---|
| 2020/0065007 A1* | 2/2020 | Tai | G06F 3/065 |
| 2020/0133513 A1 | 4/2020 | Zhang et al. | |
| 2020/0135264 A1* | 4/2020 | Brady | G11C 11/406 |
| 2020/0348879 A1* | 11/2020 | Huang | G06F 11/3466 |
| 2021/0132822 A1* | 5/2021 | Dalmatov | G06F 3/0619 |
| 2021/0247913 A1 | 8/2021 | Koseki et al. | |

* cited by examiner

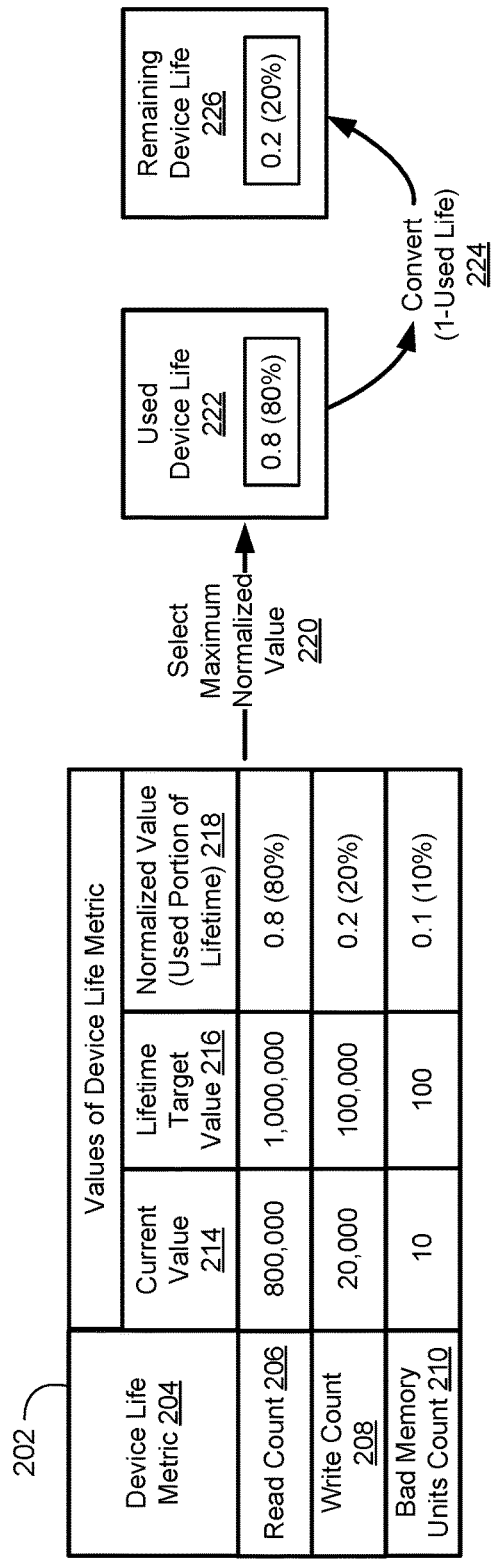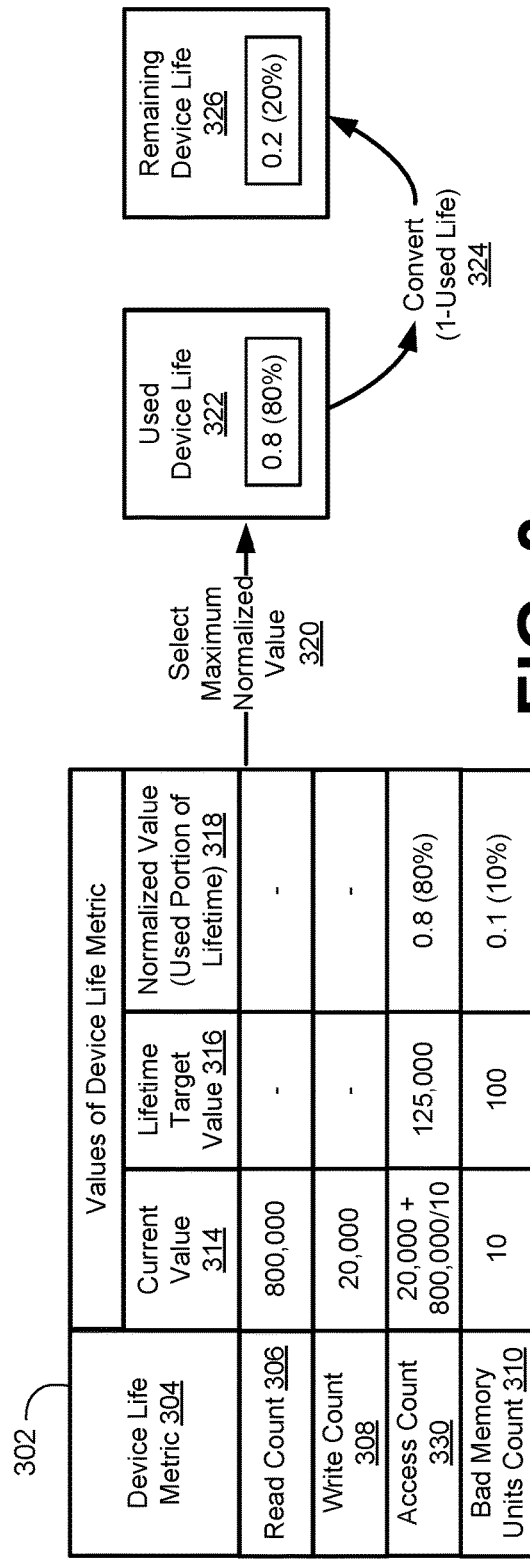

400

```
┌─────────────────────────────────────────────────────────────────┐
│ Determine a plurality of memory device life metrics, wherein    │
│ the memory device life metrics comprise a read count metric     │
│ that specifies a number of read operations performed on the     │
│ memory device                                                   │
│ 402                                                             │
└─────────────────────────────────────────────────────────────────┘
                                │
                                ▼
┌─────────────────────────────────────────────────────────────────┐
│ Calculate a plurality of normalized metric values, wherein      │
│ each of the normalized metric values is based on a ratio of a   │
│ respective memory device life metric to a lifetime target value │
│ associated with the respective memory device life metric        │
│ 404                                                             │
└─────────────────────────────────────────────────────────────────┘
                                │
                                ▼
┌─────────────────────────────────────────────────────────────────┐
│ Identify, from the plurality of normalized metric values, a     │
│ normalized metric value that satisfies a selection criterion,   │
│ wherein the identified normalized metric value corresponds to   │
│ an amount of used device life of the memory device              │
│ 406                                                             │
└─────────────────────────────────────────────────────────────────┘
                                │
                                ▼
┌─────────────────────────────────────────────────────────────────┐
│ Determine, based on the identified normalized metric value, an  │
│ amount of remaining device life of the memory device            │
│ 408                                                             │
└─────────────────────────────────────────────────────────────────┘
                                │
                                ▼
┌─────────────────────────────────────────────────────────────────┐
│ Provide the amount of remaining device life to a host system    │
│ 410                                                             │
└─────────────────────────────────────────────────────────────────┘
```

Determine at least one memory device life metric, wherein the memory device life metrics comprise an access count metric based on a number of read operations performed on the memory device, a number of write operations performed on the memory device, and a scaling factor that relates the number of read operations to the number of write operations
502

↓

Calculate at least one normalized metric value, wherein each normalized metric value is based on a ratio of a respective memory device life metric to a lifetime target value associated with the respective memory device life metric
504

↓

Identify, from the plurality of normalized metric values, a normalized metric value that satisfies a selection criterion
506

↓

Determine, based on the identified normalized metric value, an amount of remaining device life of the memory device
508

↓

Provide the amount of remaining device life to a host system
510

FIG. 5

MONITORING MEMORY DEVICE HEALTH ACCORDING TO DATA STORAGE METRICS

TECHNICAL FIELD

Embodiments of the disclosure relate generally to memory sub-systems, and more specifically, relate to monitoring memory device health according to data storage metrics in memory sub-systems.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

FIG. 2 illustrates example memory device life metrics and calculation of used device life and remaining device life based on the memory device life metrics in accordance with some embodiments.

FIG. 3 illustrates example memory device life metrics including an access count based on a read count and a write count, and calculation of used device life and remaining device life based on the memory device life metrics in accordance with some embodiments.

FIG. 4 is a flow diagram of an example method to determine remaining memory device life based on memory device life metrics in accordance with some embodiments.

FIG. 5 is a flow diagram of an example method to determine remaining memory device life based on memory device life metrics including an access count based on a read count and a write count in accordance with some embodiments.

DETAILED DESCRIPTION

Figure 1:
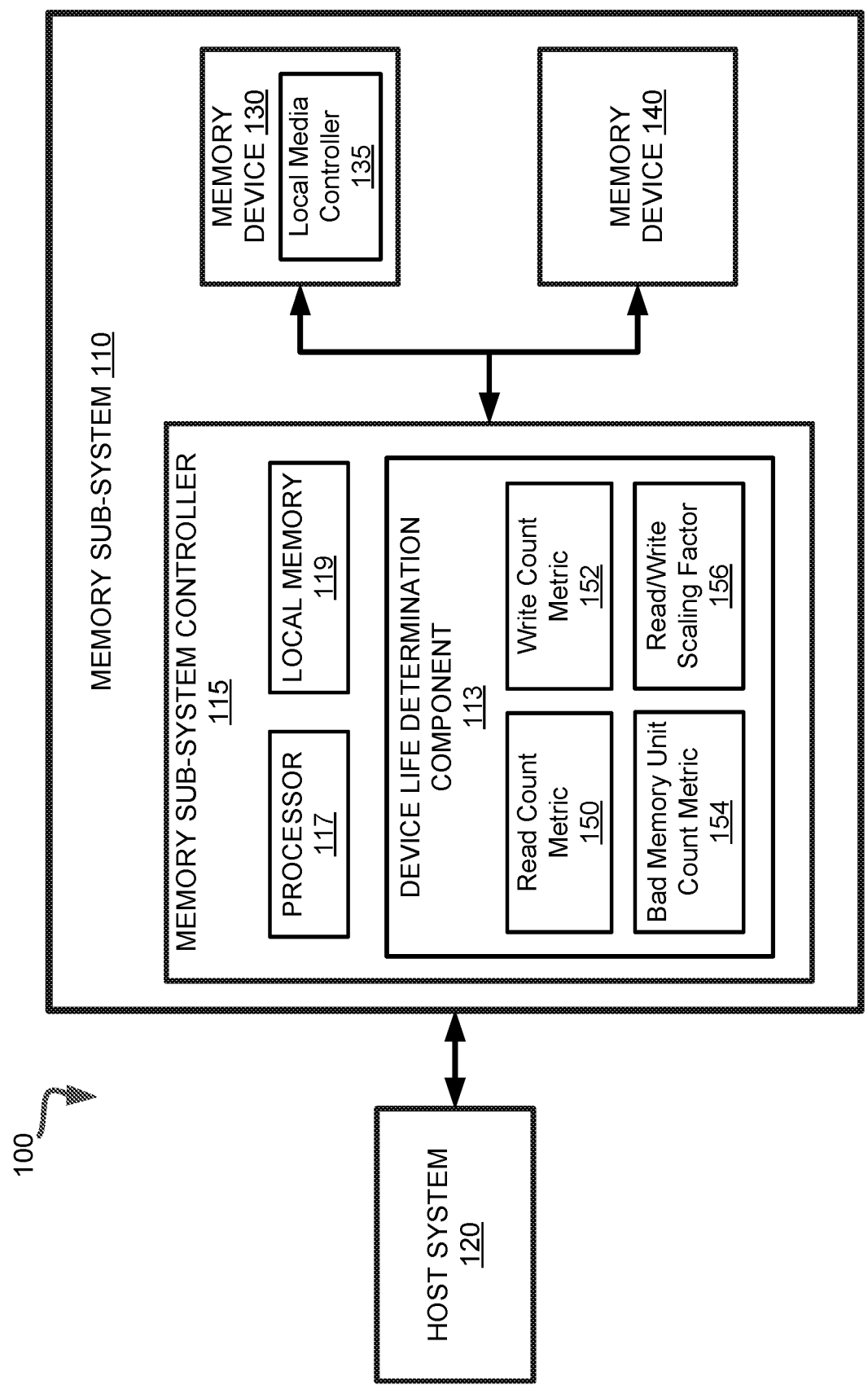
FIG. 1 illustrates an example computing system that includes a memory sub-system in accordance with some embodiments of the present disclosure.

Aspects of the present disclosure are directed to monitoring memory device health according to data storage metrics in memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that includes an array of non-volatile memory cells. A 3D cross-point memory device can perform bit storage based on a change of bulk resistance, in conjunction with a stackable cross-gridded data access array. Another example is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. A memory device can be called a "drive", which has multiple dies layered in multiple "decks."

In existing memory sub-systems, the variation in temperature and/or processing drift can negatively impact the reliability of memory devices. For example, excessive temperature used in the heating process during assembly can, over a period of time, cause crystallization of areas of the memory device (e.g., amorphous phase change memory in reset memory cells). This crystallization can decrease resistivity of the memory cells, which, in turn, decreases the threshold voltage of the memory cells. This lowering of threshold voltage can negatively impact reliability as the high voltage levels applied during memory access operations can cause voltage level instability, resulting in a higher error rate for the memory device during the operating lifetime of the memory sub-system. These properties of the memory sub-system can provide challenges in the operation of the memory sub-system and ultimately limit endurance. For example, some memory devices can be accessed (e.g., written, read, or erased) a finite number of times before the memory devices begin to physically degrade or wear and eventually fail. Data loss can occur if a memory device reaches the limit of its endurance. Some memory devices can be subject to a significant amount of physical wear if a large number of memory access operations, such as write operations (e.g., program operations) or read operations, are performed on the memory device.

The operational lifetime of a memory sub-system system (or other unit of storage, such as a memory unit, storage device, or drive) can refer to a predicted number of program/ erase cycles after which the memory sub-system does not provide a specified degree of storage reliability. Storage reliability can be specified in terms of an amount of time for which the memory sub-system can store data while maintaining an unrecoverable bit error rate below a threshold, for example. A memory sub-system's lifetime can be divided into a portion that has been used, referred to herein as "used device life," and a portion that has not yet been used, referred to herein as "remaining device life." The used device life can be represented as a percentage of the lifetime that has been used, and the remaining device life be represented as a percentage of the lifetime that has not been used. The memory sub-system can provide the remaining device life to a host system, e.g., in response to a query from the host, or as a notification sent to the host. For example, at certain remaining device life points, e.g., 3% and 1%, a memory sub-system can send notifications to the host indicating that the memory sub-system is approaching end-of-life. The host system can perform appropriate actions based on the remaining device life, so that a device approaching end-of-life can be replaced in a timely manner, and data loss can be avoided.

Existing memory sub-systems can calculate the remaining device life based on how many writes have been performed on the drive and how many bad units have been identified on the drive. Bad units can be physical blocks or other storage units that cannot be written to or for which an error has occurred. Bad units can include, for example, storage units on which write or erase operations fail, or on which read operations return errors corresponding to data loss. Data loss of a unit, such as a block, may occur when a read operation of data bits previously written to the block fails and a subsequent system-level error handling flow fails to recover the data. The remaining device life can be determined by comparing the number of writes that have been performed on the drive to a maximum number of writes in a device's expected lifetime, and comparing the number of bad units that have been identified on the drive to a maximum number of bad units. The remaining life percentage can be calculated by dividing the number of writes by the maximum number of writes, dividing the number of bad units by the maximum number of bad units, and determining which of the two quotients corresponds to a larger percentage. The larger percentage can be subtracted from 100 to determine the remaining life percentage of the drive.

However, for certain non-volatile memory types, such as 3D cross-point memory, read operations have a "partial write" effect on the media, and thus cause media wear that is not reflected in the remaining device life calculated by existing techniques. Since existing techniques do not include the cumulative memory wear caused by reads, the remaining device life calculated by existing techniques can be inaccurate and potentially lead to data loss. For example, in a read-intensive workload, such as a video streaming service, the ratio of reads to writes may be approximately 95 reads for every five writes, or in some cases 99 reads for every 1 write. Since the number of writes is low, existing techniques incorrectly indicate that the remaining device life is high, even though the drive may actually be near or at end-of-life because of wear caused by a large number of reads.

Aspects of the present disclosure address the above and other deficiencies by determining an amount of remaining life of a memory device based on memory device life metrics such as the number of reads performed on the device, the number of writes performed on the device, and the number of bad memory units identified on the device. A memory sub-system can determine an amount of remaining memory device ("device") life based on a comparison of each of the device life metrics to a respective lifetime target value ("target value") of the metric. The target value of the metric can correspond to an end-of-life of the memory device. For each of the device life metrics, the memory sub-system can determine a normalized metric value that represents an amount of the device's operational lifetime that has been used according to the respective life metric. For example, the normalized metric values can include a normalized read count, a normalized write count, and a normalized bad memory units count corresponding to the respective life metrics (read count metric, write count metric, and bad memory unit count metric). Each normalized metric value can be in a particular range, such as 0 to 1 or 0 to 100, calculated by dividing the respective memory device life metric by the associated target value.

The memory sub-system can determine characteristics of the device life to provide to the host system, such as an amount of used device life or an amount of remaining device life, based on one or more of the normalized metric values. The memory sub-system can select the used device life from the normalized metric values, e.g., by selecting the greatest of the normalized metric values. The memory sub-system can then convert the used device life to a remaining device life, and provide the remaining device life to the host system.

In some implementations, the memory sub-system can combine the read count metric and the write count metric to form a memory access count metric. The memory sub-system can determine the memory access count metric using a scaling factor that relates write wear to read wear (or vice-versa). The memory sub-system can then determine a normalized memory access count, e.g., by dividing the memory access count metric by a lifetime target memory access count. The memory sub-system can then determine a used device life and/or a remaining device life based on the normalized memory access count, e.g., by using the memory access count as an amount of used device life, or by including the normalized memory access count in a set of device life metrics that includes one or more other metrics, such as a bad memory unit count metric. The memory sub-system can select one of the metrics from the set, e.g., the metric having the greatest value, and use the selected metric as the amount of used device life, as described above.

Advantages of the present disclosure include, but are not limited to, an increase in the accuracy of the remaining-life calculation. The accuracy is particular increased for workloads having a substantially larger number of read operations than write operations in memory systems in which read operations cause wear on the memory device. Since the remaining device life can be determined more accurately, drives having a low amount of remaining device life can be detected by the host system in a timely manner and replaced, thereby preventing data loss. Thus, the risk of data loss is reduced for workloads that involve performing substantially more read operations than write operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a device life determination component 113 that can perform media-related operations for memory devices 130, 140 during operation of the memory sub-system 110. In some embodiments, the memory sub-system controller 115 includes at least a portion of the device life determination component 113. For example, the memory sub-system controller 115 can include a processor 117 (processing device) configured to execute instructions stored in local memory 119 for performing the operations described herein. In some embodiments, the device life determination component 113 is part of the host system 120, an application, or an operating system. In other embodiments, local media controller 135 includes at least a portion of device life determination component 113 and is configured to perform the functionality described herein.

The device life determination component 113 can determine an amount of remaining life of a memory device 130 based on memory device life metrics such as a read count metric 150 a write count metric 152, and a bad memory unit count metric 154. The read count metric 150 represents a number of reads performed on the memory device 130. The read count metric 150 can be incremented by the device life determination component 113 for each read operation performed by the memory sub-system controller 115 on the memory device 130. The write count metric 152 represents a number of writes performed on the memory device 130. The write count metric 152 can be incremented by the device life determination component 113 for each write operation performed by the memory sub-system controller 115 on the memory device 130.

The bad memory unit count metric 154 represents a number of bad memory units identified on the memory device 130. The bad memory unit count 154 can be incremented by the device life determination component 113 for each bad memory unit detected on the memory device 130. The memory sub-system can detect a bad memory unit if a write or erase operation on the memory unit fails, or if a read operation causes the memory sub-system to enter error recovery (e.g., to use error-correction information to reconstruct the information on the bad memory unit).

As described above, a memory sub-system's lifetime can be divided into a portion that has been used, referred to herein as "used device life," and a portion that has not yet been used, referred to herein as "remaining device life." The used device life and remaining device life can each be represented as a decimal value, e.g., between 0 and 1.0, or as a percentage between 0 and 100% that can be determined by multiplying the decimal value by, e.g., 100. Thus, the percentage can be determined from the decimal value, and vice versa. The sum of the used device life and the remaining device life is 1.0 or 100%, so the remaining device life can be determined from the used device life, and vice versa.

The device life determination component 113 can determine an amount of remaining device life for memory device 130 based on a comparison of a current value of each of the memory device life metrics to a respective lifetime target value of the characteristic. The lifetime target value of the memory device life metric can correspond to an end-of-life of the memory device. Values of the memory device life metric below the lifetime target value indicate that the device is within its operational lifetime according to the particular memory device life metric. In some embodiments, for each of the memory device life metrics, the device life determination component 113 can determine a normalized metric value ("normalized value") that represents an amount of the device's operational lifetime that has been used according to the respective memory device life metric. The normalized values can include a normalized read count, a normalized write count, and a normalized bad memory units count corresponding to the respective life metrics (read count metric 150, write count metric 152, and bad memory unit count metric 154). Each normalized value can be in a particular range, such as 0 to 1 (or 0 to 100%), calculated by dividing the respective memory device life metric by its associated target value.

The normalized values can be used to perform comparisons between different device life metrics. For example, a normalized read count can be determined by dividing the read count metric 150, e.g., 400, by a target number of reads, e.g., 1000, to produce a normalized read count of 0.4 (40%). A normalized write count can be determined by dividing a write count metric 152, e.g., 100, by a target number of writes, e.g., 500, to produce a normalized write count of 0.2 (20%).

The device life determination component 113 can determine characteristics of the device life to provide to the host system 120, such as an amount of used device life or an amount of remaining device life, based on one or more normalized metric values. The device life determination component 113 can select one or more of the normalized metric values to use as the used device life. The one or more of the normalized metric values can be selected using a selection criterion. The selection criterion can select the greatest normalized metric value, in which case the used device life is determined according to the memory device life metric that is closest to its associated lifetime target. The device life determination component 113 can provide the selected value to the host system 120 as the used device life. The device life determination component 113 can additionally or alternatively convert the amount of used device life to an amount of remaining device life, e.g., by subtracting the used device life from 1.0 (or 100%), and provide the remaining device life to the host system 120. For example, if the normalized read count (40%) is greater than the normalized write count (20%), the selected used device life is 40%, and the corresponding remaining device life is 60%.

As another example, if the read count metric 150 is 50, the read count lifetime target is 100, the write count metric 152 is 30, and the write count lifetime target is 100, then the greatest normalized metric is the greater of 0.5 (50%) and 0.3 (30%), which is 0.5. Thus, in this example, the amount of used device life is determined according to the read count. The remaining device life can be determined by subtracting the used device life from 1.0. In this example, the remaining device life is 1.0-0.5=0.5, which corresponds to 50% of the memory device's lifetime.

Read operations can cause wear at a different rate than write operations, so the device life determination component 113 can convert a number of read operations to a corresponding number of write operations (or vice-versa) using a scaling factor 156. The device life determination component 113 can compute a combined read/write metric based on the scaling factor, and use a target read/write count to determine a read/write metric. The scaling factor can be a characteristic of the memory device, e.g., specified at manufacturing time or provided by a device manufacturer. The scaling factor indicates a difference in an amount of physical wear to the memory device caused by write operations and an amount of physical wear caused by read operations. In some embodiments, a scaling factor can correspond to a difference between an error rate for the memory device after performing a particular number of write operations and an error rate for the memory device after performing a particular number of read operations.

For example, if the scaling factor is 1 write to 5 reads (indicating that 1 write causes the same amount of wear as 5 reads), then the device life determination component 113 can convert the current number of read operations to a number of write operations by multiplying the current number of read operations by the scaling factor 156 (e.g., ⅕). The device life determination component 113 can determine the combined read/write count by adding the current number of write operations to the product of the current number of read operations and the scaling factor 156. The device life determination component 113 can then determine an access (read and write) count metric by dividing the access count by a target access count that represents a number of read and write operations that can be performed during an expected lifetime of the drive. As described above, the device life determination component 113 can determine the remaining device life by identifying the greatest of the normalized metric values. In this example, the device life determination component 113 can identify the greater of the access count metric and the bad memory unit metric. The device life determination component 113 can convert the identified greatest metric to an amount of remaining device life, e.g., by subtracting the greatest metric from 1. The resulting amount of remaining device life can be multiplied by 100 to produce a remaining device life percentage. Further details relating to the operations of the device life determination component 113 are described below.

FIG. 2 illustrates example memory device life metrics 204 and calculation of used device life 222 and remaining device life 226 based on the memory device life metrics in accordance with some embodiments. A table 202 includes three example device life metrics 204: a read count 206, a write count 208, and a bad memory units count 210. The table 202 also includes three values associated with each device life metric 204: a current value 214, a lifetime target value 216, and a normalized value 218.

The table 202 can be generated and updated by a device life determination component 113. For example, for each read operation performed by a memory sub-system 110, the device life determination component 113 can increment a current value 214 of the read count 206. The current value 214 of the read count 206 is "800,000" in the table 202, representing 800,000 read operations that have been performed on a memory device 130. The device life determination component 113 can similarly increment the current value 214 of the write count 208 for each write operation performed on the memory device 130, and increment the current value 214 of the bad memory units count 210 for each bad memory unit detected on the memory device 130. The current value 214 of the write count 208 is "20,000," representing 20,000 write operations that have been performed on the memory device 130. The current value 214 of the bad memory units count 210 is "10," representing 10 bad memory units that have been detected on the memory device 130.

The normalized value 218 represents a used portion of the device's lifetime as a value between 0 and 1 (or a corresponding percentage value between 0 and 100%). The device life determination component 113 can calculate the normalized value 218 by dividing the current value 214 by the lifetime target value 216. The lifetime target values 216 of the read count 206, write count 208, and bad memory units count 210 can be characteristics or configured values of the memory sub-system 110.

The lifetime target value 216 of the read count 206 is "1,000,000" in the table 202, indicating that 1,000,000 read operations can be performed during the operational lifetime of the memory device 130. After 1,000,000 read operations, the memory device 130 is past its operational lifetime according to the read count metric. The lifetime target value 216 of the write count 208 is "100,000" in the table 202, indicating that 100,000 write operations can be performed during the operational lifetime of the memory device 130. After 100,000 write operations, the memory device 130 is past its operational lifetime according to the write count metric. The lifetime target value 216 of the bad memory units count 210 is "100" in the table 202, indicating that 100 bad memory units can be identified during the operational lifetime of the memory device 130. After identifying 100 bad memory units, the memory device 130 is past its operational lifetime according to the bad memory units count metric.

The normalized value of the read count metric 206 is "0.8 (80%)" in the table 202, indicating that 0.8 (or 80%) of the lifetime target number of read operations have been performed on the memory device 130. The normalized value "0.8" of the read count metric 206 can be calculated by dividing the current value "800,000" by the lifetime target value "1,000,000." The normalized value of the write count metric 208 is "0.2 (20%)" in the table 202, indicating that 0.2 (or 20%) of the lifetime target number of write operations have been performed on the memory device 130. The normalized value "0.2" of the write count metric 208 can be calculated by dividing the current value "20,000" by the lifetime target value "100,000." The normalized value of the bad memory units count metric 210 is "0.1 (10%)" in the table 202, indicating that 0.1 (or 10%) of the lifetime target number of read operations have been performed on the memory device 130. The normalized value "0.1" of the bad memory units count metric 206 can be calculated by dividing the current value "10" by the lifetime target value "100."

To determine the used device life 222, the device life determination component 113 can select the greatest (e.g., maximum) normalized value 218. In the example table 202, the greatest normalized value is 0.8, so the device life determination component 113 selects 0.8 (which corresponds to 80%) as the value for the used device life 222. The device life determination component 113 can determine the remaining device life 226 by subtracting the used device life 222 from 1.0 (or from 100% if the values are represented as percentages). Thus, in this example, the remaining device life 226 is 0.2 (or 20%). Since the selected normalized value of 0.8 is for the read count 206, the used device life 222 and remaining device life 226 are determined based on the read count 206 in this example.

FIG. 3 illustrates example memory device life metrics 304 including an access count 330 based on a read count 306 and a write count 308, and calculation of used device life 322 and remaining device life 326 based on the memory device life metrics in accordance with some embodiments. A table 302 includes four example device life metrics 304: a read count 306, a write count 308, an access count 330, and a bad memory units count 310. The table 302 also includes up to three values associated with each device life metric 304: a current value 314, a lifetime target value 316, and a normalized value 318. The current values 314 of the read count 306 and write count 308 can be generated and updated as described above with respect to FIG. 2.

The current value 314 access count 330 can be calculated based on a combination of the read count 306 and write count 308. The device life determination component 113 can calculate the current value 314 and normalized value 318 of the access count 330 in response to a request to determine a used device life 322 or remaining device life 326, for example. The device life determination component 113 can calculate the current value 314 of the access count 310 by adding the current value of the write count to the product of the current value of the read count and the scaling factor. In the example table 302, the current value 314 of the access count 330 is 100,000, which is calculated by "20,000+800, 000/10," where 20,000 is the current value of the write count, 800,000 is the current value of the read count, and 10 is a scaling factor that relates the read count to the write count (e.g., 10 reads correspond to 1 write).

The device life determination component 113 can calculate the normalized value 318 of the access count by dividing the current value 314 of the access count 330 by the target value 316 of the access count 330. The lifetime target value 316 of the access count 330 is "125,000" and can be a characteristic or configured value of the memory sub-system 110.

The device life determination component 113 can use the normalized value 318 of the access count 330 in place of the normalized values of the read count 306 and write count 308. Thus, in the table 302, a lifetime target value 316 need not be specified for the read count 306 or write count 308. Similarly, in the table 302, the normalized values 318 of the read count 306 and write count 308 need not be calculated. The current value 314, target value 316, and normalized value 318 of the bad memory units count 310 are 10, 100, and 0.1 (10%), respectively, and can be determined as described above with respect to FIG. 2.

To determine the used device life 322, the device life determination component 113 can select the greatest (e.g., maximum) normalized value 318. Similarly to the example of FIG. 2, in the example table 302, the greatest normalized value is 0.8, so the device life determination component 113 selects 0.8 (which corresponds to 80%) as the value for the used device life 322. The device life determination component 113 can determine the remaining device life 326 based on the used device life 322 as described above with respect to FIG. 2.

FIG. 4 is a flow diagram of an example method 400 to determine remaining memory device life based on memory device life metrics in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the device life determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic determines a plurality of memory device life metrics. The memory device life metrics can include one or more of a read count metric that specifies a number of read operations performed on the memory device, a write count metric that specifies a number of write operations performed on the memory device, or a bad memory unit metric that specifies a number of bad memory units identified on the memory device. The processing logic can perform operation 402 in response to receiving the request for the indication of the amount of remaining device life. The request can be received from a host system 120, for example.

At operation 404, the processing logic calculates a plurality of normalized metric values, wherein each of the normalized metric values is based on a ratio of a respective memory device life metric to a lifetime target value associated with the respective memory device life metric. The lifetime target value can corresponds to an end of an operational lifetime of the memory device according to the respective device life metric.

At operation 406, the processing logic identifies, from the plurality of normalized metric values, a normalized metric value that satisfies a selection criterion, wherein the identified normalized metric value corresponds to an amount of used device life of the memory device. The identified normalized metric value can be a maximum of the normalized metric value, for example.

At operation 408, the processing logic determines, based on the identified normalized metric value, an amount of remaining device life of the memory device. The processing logic can determine the amount of remaining device life by subtracting the used device life from 1.0 (or 100%), for example.

At operation 410, the processing logic provides the amount of remaining device life to a host system. The processing logic can provide the amount of remaining drive life to the host system in response to a request for an indication of the amount of remaining device life. Alternatively or additionally, the processing logic can monitor the amount of remaining device life (and/or used device life) by calculating the remaining device life (e.g., using method 400) at periodic times or in response to a threshold number of read or write operations being performed, for example. The processing logic can determine whether the calculated remaining device life satisfies a threshold remaining life criterion, e.g., the remaining device life is less than a threshold value such as 0.03 or 0.01, and if so, send a notification to the host system indicating that the amount of remaining device life is below the threshold value.

In some embodiments, the processing logic can calculate an access count based on the read count metric and a write count metric, and use the access count as a metric for the device life. The processing logic can calculate the access count based on the write count, the read count, and a scaling factor R according to the following formula:

$$access\_count = write\_count + read\_count/R$$

The processing logic can calculate the access count in response to a request for the amount of used or remaining drive life, and need not update the access count for each read or write operation.

The read count metric and write count metric can be included in the plurality of memory device life metrics. Alternatively, the processing logic can update the access count in response to each read or write operation without storing separate read and write counts. For example, the processing logic can increment the access count for each write operation, and add 1/R to the access count for each read operation. The processing logic can calculate a normalized value of the access count as a ratio of the access count to a lifetime target access count value. The lifetime target access count value can be a characteristic of the memory device, for example.

FIG. 5 is a flow diagram of an example method 500 to determine remaining memory device life based on memory device life metrics including an access count based on a read count and a write count in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the device life determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic determines at least one memory device life metric, wherein the memory device life metrics comprise an access count metric based on a number of read operations performed on the memory device, a number of write operations performed on the memory device, and a scaling factor 156 that relates the number of read operations to the number of write operations. For example, the processing logic can calculate the access count metric by adding the read count metric to a product of the read count metric and the scaling factor 156. The processing logic can then determine a normalized memory access count, e.g., by dividing the memory access count metric by a lifetime target memory access count. The lifetime target memory access count can be a characteristic of the memory device determined based on media characterization or the like. The processing logic can determine a used device life and/or a remaining device life based on the normalized memory access count, e.g., by using the memory access count as an amount of used device life, or by including the normalized memory access count in a set of device life metrics that includes one or more other metrics, such as a bad memory unit count metric. The processing logic can select one of the metrics from the set, e.g., the metric having the greatest value, and use the selected metric as the amount of used device life, as described above.

At operation 504, the processing logic calculates at least one normalized metric value, wherein each normalized metric value is based on a ratio of a respective memory device life metric to a lifetime target value associated with the respective memory device life metric. At operation 506, the processing logic identifies, from the plurality of normalized metric values, a normalized metric value that satisfies a selection criterion. The selection criterion can select the greatest normalized metric value, for example. The identified normalized metric value corresponds to an amount of used device life.

At operation 508, the processing logic determines, based on the identified normalized metric value, an amount of remaining device life of the memory device. The processing logic can determine the amount of remaining device life by subtracting the identified normalized metric value (which corresponds to the used device life) from 1.0 (or 100%), for example. At operation 510, the processing logic provides the amount of remaining device life to a host system 120, e.g., via a communication protocol between the host system 120 and the processing logic.

Figure 6:
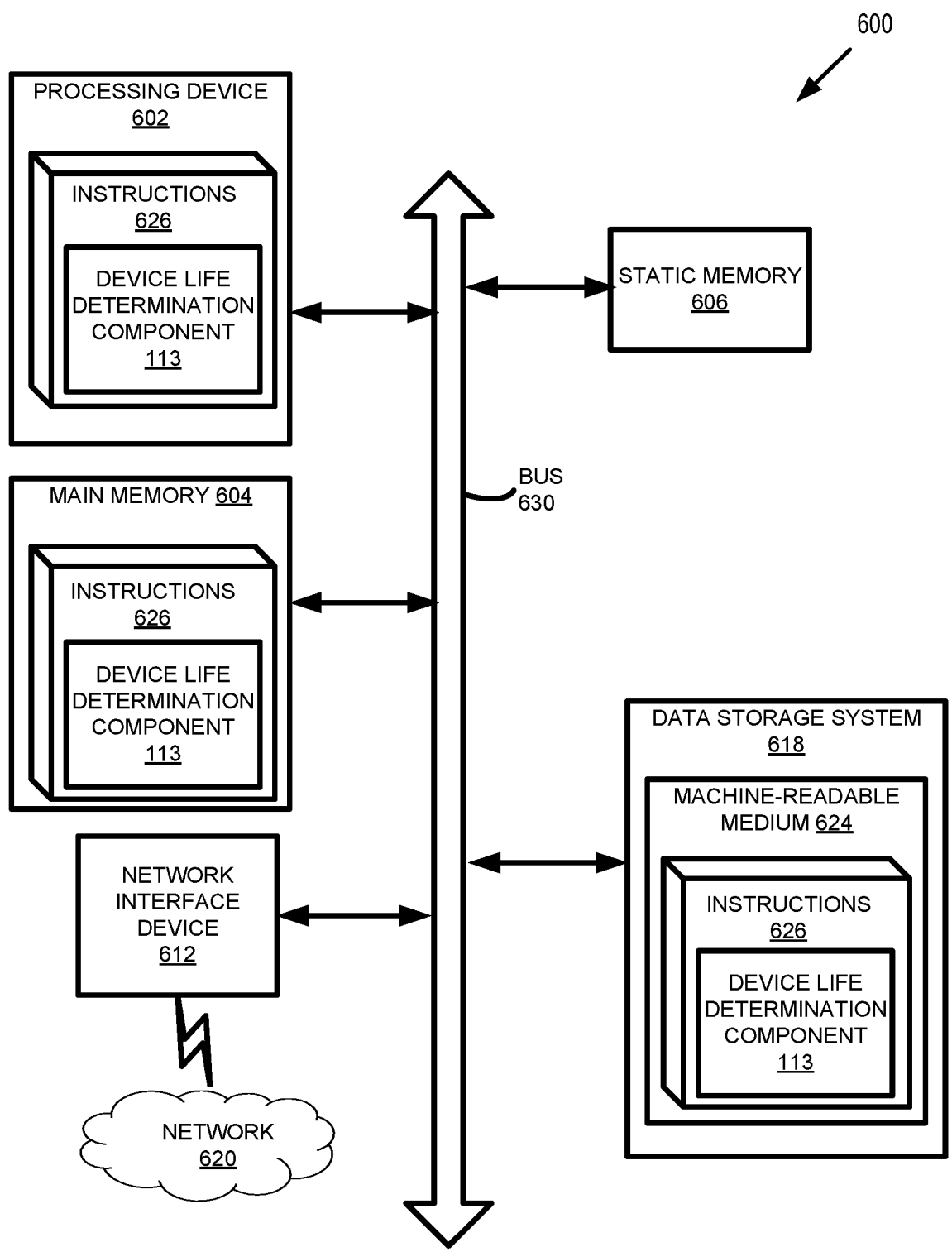
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a device life determination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory device life determination (e.g., the device life determination component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
  a memory device; and
  a processing device, operatively coupled to the memory device, to perform operations comprising:
    determining a plurality of different memory device life metrics, wherein a first life metric comprises a read count that specifies a first number of read operations performed on the memory device and a write count that specifies a second number of write operations performed on the memory device, wherein the first life metric reflects a physical wear of the memory device;
    determining, based on the first life metric, whether a workload of the memory device is a read-intensive workload;
    responsive to determining workload of the memory device is a read-intensive workload, determining a scaling factor for one or more of the plurality of different memory device life metrics, the scaling factor based on a first error rate and a second error rate, the first error rate corresponding to performing a particular number of read operations on the memory device and the second error rate corresponding to performing the particular number of write operations on the memory device;
calculating a plurality of different normalized metric values of the memory device, wherein each of the different normalized metric values is based on a ratio of a different respective memory device life metric to a respective lifetime target value associated with the different respective memory device life metric, wherein a first normalized life metric comprises a normalized physical wear metric determined based on the first life metric and the scaling factor;
determining based on the first normalized life metric that the workload is the read-intensive workload;
determining, by comparing the first normalized metric value to each other different normalized metric values of the plurality of different normalized metric values, that the first normalized metric value satisfies a selection criterion, wherein a normalized metric value that satisfies the selection criterion is closest to the respective lifetime target value associated with the different respective memory device life metric, and wherein the normalized metric value corresponds to an amount of used device life of the memory device;
determining, based on the first normalized metric value, an amount of remaining device life of the memory device; and
responsive to determining the amount of remaining device life of the memory device, providing an indication of the amount of remaining device life to a host system, the indication of the amount of remaining device life comprising an indication to replace the memory device.

2. The system of claim 1, wherein the plurality of different memory device life metrics further comprise a second life metric comprising the write count and a third life metric comprising a bad memory unit count that specifies a number of bad memory units identified on the memory device.

3. The system of claim 1, wherein the respective lifetime target value associated with the different respective memory device life metric corresponds to an end of an operational lifetime of the memory device according to the different respective device life metric.

4. The system of claim 1, wherein the plurality of different normalized metric values comprises the first normalized metric value and a second normalized metric value, and wherein the operations further comprise: determining by comparing the first normalized metric value with the second normalized metric value, that the first normalized metric value satisfies the selection criterion, wherein the first normalized metric value corresponds to a lesser amount of remaining life of the memory device than the second normalized metric value.

5. The system of claim 1, wherein the plurality of different memory device life metrics comprise a second life metric comprising the write count and a third life metric comprising the read count, and wherein the operations further comprise: determining a fourth life metric of the plurality of different memory device life metrics, the fourth life metric comprising an access count based on the read count, the write count, and the scaling factor; calculating a second normalized life metric of the plurality of different normalized metric values based on the fourth life metric and a lifetime target access count value.

6. The system of claim 5, wherein determining the access count comprises:
adding the write count to a product of the read count and the scaling factor.

7. The system of claim 1, wherein the operations further comprise:
receiving, from the host system, a request for the indication of the amount of remaining device life, wherein determining the plurality of different memory device life metrics is in response to receiving the request for the indication of the amount of remaining device life.

8. The system of claim 1, wherein the operations further comprise:
determining whether the amount of remaining device life satisfies a threshold remaining life criterion; and
responsive to determining that the amount of remaining device life satisfies the threshold remaining life criterion, sending, to the host system, a notification comprising the amount of remaining device life.

9. A method comprising: determining a first memory device life metric of one or more different memory device life metrics, wherein the first memory device life metric comprises an access count based on a number of read operations performed on the memory device, a number of write operations performed on the memory device, and a scaling factor that relates a first error rate corresponding to the number of read operations to a second error rate corresponding to the number of write operations; calculating a first normalized metric value of the memory device of one or more different normalized memory device life metrics corresponding each corresponding to a memory device life metric of the one or more different memory device life metrics, wherein the first normalized metric value is based on a ratio of a first memory device life metric to a first lifetime target value associated with the first memory device life metric; determining based on the first normalized metric value, that a workload of the memory device is a read-intensive workload; responsive to determining the workload is the read-intensive workload, determining whether the first normalized metric value is a greatest normalized metric value of the one or more different normalized memory device life metrics, wherein the first normalized metric value corresponds to an amount of used device life of the memory device; determining, based on the identified first normalized metric value, an amount of remaining device life of the memory device; and responsive to determining the amount of remaining device life of the memory device satisfies an end-of-life threshold, providing a first indication to a host system of the amount of remaining life for the memory device, and a second indication to replace the memory device.

10. The method of claim 9, wherein the access count is determined based on a sum of the write count and a scaled read count, wherein the scaled read count is determined based on a product of the read count and the scaling factor.

11. The method of claim 9, wherein the one or more different memory device life metrics comprise a second memory device life metric comprising a bad memory unit count that specifies a number of bad memory units identified on the memory device.

12. The method of claim 9, wherein the first lifetime target value associated with the first memory device life metric corresponds to an end of an operational lifetime of the memory device.

13. The method of claim 9, wherein the one or more different normalized memory device metrics comprise a second normalized metric value, the method further comprising:

identifying, from the one or more different normalized memory device metrics, an identified memory device metric that satisfies a selection criterion, wherein the identified normalized metric value corresponds to a lesser amount of remaining life than each of the one or more different normalized memory device metrics.

14. The method of claim 9, further comprising:
receiving, from the host system, a request for an indication of the amount of remaining device life, wherein determining the first different memory device life metric is in response to receiving the request for the indication of the amount of remaining device life.

15. The method of claim 9, further comprising:
determining whether the amount of remaining device life satisfies a threshold remaining life criterion; and
responsive to determining that the amount of remaining device life satisfies the threshold remaining life criterion, sending, to the host system, a notification comprising the amount of remaining device life.

16. A non-transitory machine-readable storage medium storing instructions that cause a processing device to perform operations comprising:
determining a plurality of different memory device life metrics, wherein a first metric comprises a read count that specifies a first number of read operations performed on a memory device and a write count metric that specifies a second number of write operations performed on the memory device;
determining, based on the first life metric, whether a workload of the memory device is a read-intensive workload;
responsive to determining the workload is the read-intensive workload, determining a second life metric of the plurality of different memory device life metrics, the second life metric comprising an error rate based on the read count, the write count, and a scaling factor that relates a first error rate corresponding to the read count metric to a second error rate corresponding to the write metric;
calculating a plurality of different normalized metric values of the memory device, wherein each of the different normalized metric values is based on a ratio of a respective memory device life metric to a different respective lifetime target value associated with the different respective memory device life metric, and wherein the plurality of normalized metric values comprise a normalized error rate metric value corresponding to the second memory device life metric;
identifying, by comparing each different normalized metric value of the plurality of different normalized metric values to other different normalized metric values of the plurality of different normalized metric values, an identified normalized metric value of the plurality of different normalized metric values that satisfies a selection criterion, wherein the normalized metric value that satisfies the selection criterion is closest to the respective lifetime target value associated with the different respective memory device life metric, wherein the identified normalized metric value corresponds to an amount of used device life of the memory device;
determining, based on the identified normalized metric value, an amount of remaining device life of the memory device; and
providing an indication of the amount of remaining device life to a host system, wherein the indication of the amount of remaining device life comprises an indication to replace the memory device.

17. The non-transitory machine-readable storage medium of claim 16, wherein the plurality of different memory device life metrics further comprise a third life metric comprising the write count, and a fourth life metric comprising a bad memory unit count that specifies a number of bad memory units identified on the memory device.

18. The non-transitory machine-readable storage medium of claim 16, wherein the lifetime target value associated with the different respective memory device life metric corresponds to an end of an operational lifetime of the memory device according to the corresponding different device life metric.

19. The non-transitory machine-readable storage medium of claim 16, wherein the plurality of different normalized metric values comprises the identified normalized metric value and one or more second normalized metric values, and wherein identifying the normalized metric value that satisfies the selection criterion comprises:
determining that the identified normalized metric value corresponds to a lesser amount of remaining life than each of the second normalized metric values.

20. The non-transitory machine-readable storage medium of claim 16, wherein the operations further comprise:
determining an access count metric based on the read count, the write count, and the scaling factor that relates the read count to the write count for the memory device,
wherein the different normalized metric values include a normalized access count value calculated based on a ratio of the access count metric to a lifetime target access count value.

* * * * *